(12) United States Patent
Miao (10) Patent No.: US 6,937,603 B1
(45) Date of Patent: Aug. 30, 2005

(54) OPTIMIZING BUFFER LATENCY IN A STREAMED PACKET DELIVERY SESSION

(75) Inventor: Kai Miao, Boonton Township, NJ (US)

(73) Assignee: Intel Corporation, Santa Clara, CA (US)

( * ) Notice: Subject to any disclaimer, the term of this patent is extended or adjusted under 35 U.S.C. 154(b) by 771 days.

(21) Appl. No.: 09/585,744

(22) Filed: Jun. 2, 2000

(51) Int. Cl.$^7$ .............................................. H04L 12/28
(52) U.S. Cl. .................... 370/395.62; 370/516
(58) Field of Search ............................ 370/252, 395.4, 370/395.62, 412, 413, 415, 503, 516, 517, 370/519

(56) References Cited

U.S. PATENT DOCUMENTS

| | | | | |
|---|---|---|---|---|
| 4,453,247 A | * | 6/1984 | Suzuki et al. ............... | 370/252 |
| 4,817,085 A | * | 3/1989 | De Prycker ................. | 370/252 |
| 5,381,404 A | * | 1/1995 | Sugano et al. .............. | 370/238 |
| 5,483,523 A | * | 1/1996 | Nederlof ..................... | 370/394 |
| 5,623,483 A | * | 4/1997 | Agrawal et al. ............ | 370/253 |
| 6,032,189 A | * | 2/2000 | Jinzenji et al. ............. | 709/235 |
| 6,157,653 A | * | 12/2000 | Kline et al. ................. | 370/412 |
| 6,259,677 B1 | * | 7/2001 | Jain ........................... | 370/252 |
| 6,370,125 B1 | * | 4/2002 | Belk .......................... | 370/312 |
| 6,430,160 B1 | * | 8/2002 | Smith et al. ................ | 370/252 |
| 2002/0191645 A1 | * | 12/2002 | Lauret ........................ | 370/516 |

FOREIGN PATENT DOCUMENTS

WO    WO 9935763 A1  *  7/1999  ..........  H04B 1/707

OTHER PUBLICATIONS

Katsinis, C. "The Effect of Related Message Transfer and Process Times on Waiting Times and Buffer Sizes in Switch Architectures". IEEE Southeastcon '92. Birmingham, AL. Apr. 12-15, 1992. vol. 2. pp. 730-736.*
Steyaert, B. et al. "A General Relationship Between Buffer Occupancy and Delay in Discrete-Time Multiserver Queueing Models, Applicable in ATM Networks". IEEE INFOCOM '93. San Francisco, CA. Mar. 28-Apr. 1, 1993. vol. 3. pp. 1250-1258.*

* cited by examiner

Primary Examiner—John Pezzlo
Assistant Examiner—Donald L Mills
(74) Attorney, Agent, or Firm—Blakely, Sokoloff, Taylor & Zafman LLP (57) ABSTRACT

A method of optimizing the buffer latency in a streaming application for delivering streamed packets over a network. The packet delays are dynamically recorded for forming a histogram of the frequencies of occurrence associated with each delay. The histogram is updated plural times during a single session. A optimal latency is obtained from the updated histogram at which the packet loss percentage is within a predetermined amount and the optimal latency is less than a allowable maximum delay required by the application. The size of the buffer is thus adjusted.

17 Claims, 8 Drawing Sheets

BDUi: Buffer and Delay Units

OPTIMIZING BUFFER LATENCY IN A STREAMED PACKET DELIVERY SESSION

TECHNICAL FIELD OF THE INVENTION

This invention relates to streamed data delivery technology, and more particularly, to a method of establishing an optimal buffering latency in a streamed data packet delivery system over a packet-switched network. The invention is preferably useful in an Internet gateway.

BACKGROUND OF THE INVENTION

Streamed data delivery technology is useful in delivering sound or video data over a packet-switched data network such as the Internet because the sound or the video can be played almost immediately during a realtime information exchange session. The audio or video data is delivered continuously as sequential packets. Such a system is used to implement Internet telephony, a term used to describe the transmission of telephone calls over the Internet.

One problem with achieving acceptable quality telephone calls over the Internet is the varying delays of a packet network such as the Internet. Specifically, such Internet telephone calls are typically implemented between gateways that communicate over the Internet. Each gateway is then connected to an end user telephone over a conventional telephone network or through other means. An exemplary such system is shown in FIG. 1.

Figure 1:
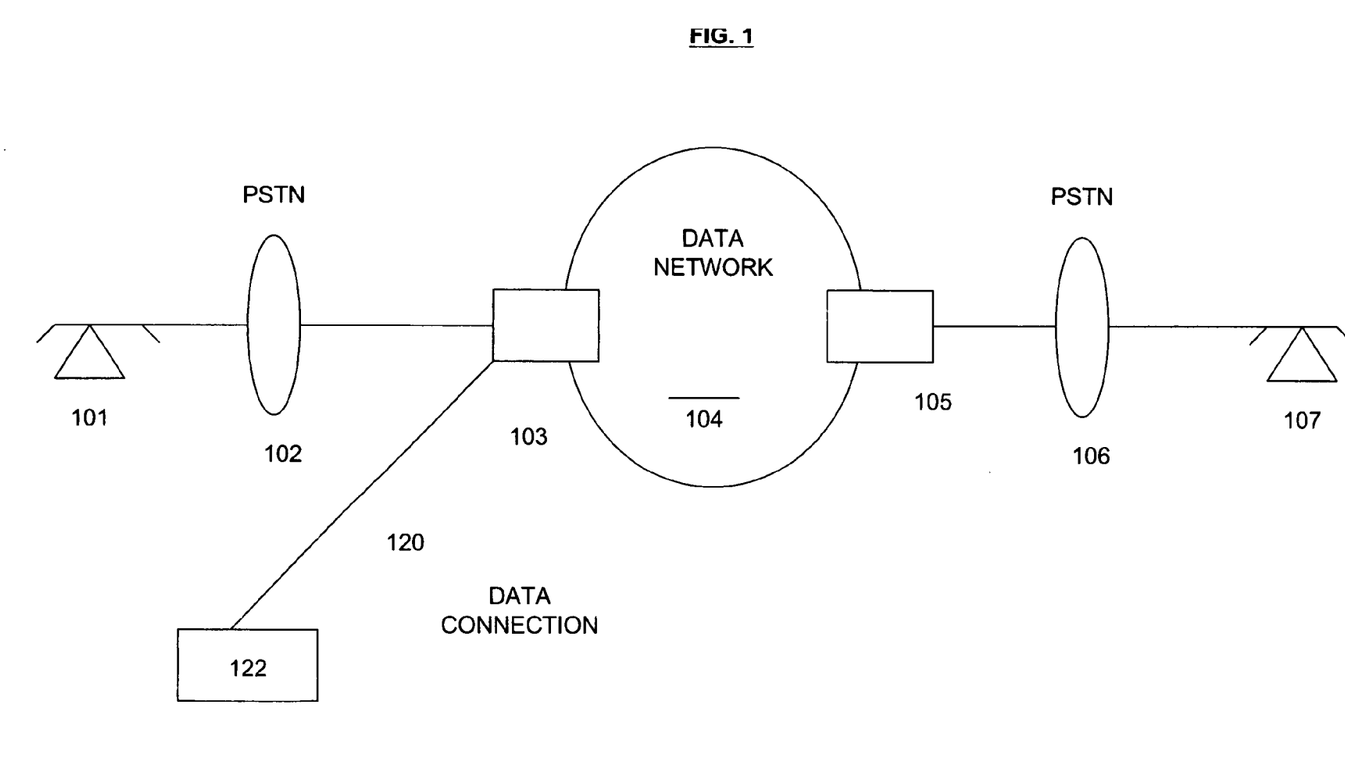
FIG. 1 shows an exemplary embodiment of a system of completing an internet telephone call.

Using the arrangement of FIG. 1, a telephone call may be completed between telephones 101 and 107. The audio from telephone 101 to telephone 107 travels over a conventional public switched telephone network (PSTN) 102 and is received by gateway 103. The audio is then packetized and transmitted using an internet protocol and other well known packet switching techniques to a gateway 105, which may be located in a remote country. Typically, the packetized voice is also encoded using one or more standards such as G 729, G 723, etc.

At gateway 105, the received packets are converted back to a conventional audio signal for transmission over a PSTN 106 to telephone 107. Communications in the opposite direction, from telephone 107 to telephone 101, is typically accomplished in an identical fashion. Additionally, one or both telephones may involve a computer connection directly to the gateway, as indicated at 120 and 122.

Considering, for explanation purposes, audio traveling from telephone 101 to telephone 107, one problem is the variable delays that the packets exchanged between gateway 103 and gateway 105 experience. Specifically, although the packets leave gateway 103 in a specified order, they often do not arrive at gateway 105 in the same order. The packets are switched through the network 104 using different paths which may change dynamically during any one call. Additionally, the router switches that convey the packets through network 104 may be busier at certain times than at others, thereby introducing varying delays. Since the packets often represent human voice, packets may not be presented out of order. Rather, the packets must be put into their original sequence, at the receiving gateway 105, and then turned back onto analog voice.

A buffer may be provided at the receiving gateway to hold packets. The buffer introduces an additional delay at the receiving gateway, but permits packets arriving out of order to be rearranged in sequence. Thus, the packets that leave the receiving gateway to be transmitted to the receiving telephone 107 are in the proper order. If the gateway 105 converts the packets to analog voice, then the analog signal is properly constructed based upon packets in the right order.

If a packet experiences a delay through the network that is unusually long, it could arrive too late to be used and must therefore be discarded. For example, consider three sequentially transmitted packets P1, P2, and P3. If the first packet PI arrives at receiving gateway 105 after P2 and P3 have already been transmitted from gateway 105 to telephone 107, then P1 must be discarded. It would make no sense to send earlier occurring voice to the listener after later occurring voice has already been heard by that listener.

In order to ensure that only a small number of packets are lost, it is desirable to make the buffer at gateway 105 very long in time. This means that packets that experience a relatively large delay (i.e., much longer than average) through the network can still be placed into sequence at the receiving gateway 105 before the earlier arriving packets are sent to the listener. On the other hand, a long buffer latency at receiving gateway 105 means there will be a relatively long delay between a speaker at telephone 101 speaking and the speech arriving at telephone 107. This relatively long delay is undesirable, and often results in the parties interrupting each other.

In order to optimize the buffer latency in such systems, typically, a statistical estimate of packet delays is calculated or arrived at empirically. An acceptable probability of lost packets is then specified, and the buffer latency is set at the minimum amount that assures that an acceptable level of packets lost for a given set of statistics regarding packet delay variances. This trades off delay (i.e. latency) against packet loss. The longer the delay, the less chance of packet loss.

The foregoing solution is less than optimal because it can result in false buffer adjustment. For example, the delays over the network are not always constant. During times when the delays are less than calculated, the buffer is too long and introduces extra delay. During times when the network is more congested and the packet delay increases, the latency will probably not be long enough and too many packets will be lost. Therefore, it is desirous to have an optimal buffer latency to avoid an incorrect buffer adjustment so as to insure good audio quality as well as to minimize the buffer latency.

DETAILED DESCRIPTION OF THE INVENTION

The present invention is directed to a technique in which the buffer size at a receiving gateway or other receiver is optimized from updated delay information over the network. More particularly, the packet delays are recorded for all the packets that have been delivered and a histogram of the frequencies of occurrence associated with each delay is formed based on the recorded delays. The histogram is updated plural times during a single delivery session. In a preferred embodiment, the updating is done in a recursive fashion, or it may be accomplished after the transmission of every Nth packet, where N is a finite number. Initially, a reasonable histogram (i.e. probability distribution function) is assumed based upon known characteristics of such networks.

As each packet arrives, it is placed into a buffer and delayed an amount of time ta. The buffer delay $t_a$ is equal to the network transmission delay experienced by that packet subtracted from the optimal delay, $t_{ed}$, that a packet may experience for a given probability of packet loss. Thus, each packet is given a customized delay at the receiver so that its total delay (e.g., network transmission delay plus the buffer delay $t_a$) equals $t_{ed}$. Moreover, the optimal delay $t_{ed}$ dynamically adapts, in order to provide the shortest possible buffer latency for a given probability of error. The optimal delay $t_{ed}$ is also capped at a maximum latency $t_q$, to insure that the maximum permitted latency is not exceeded.

In a preferred embodiment, the histogram is updated when every Nth packet is received or for every predetermined interval of time. The integer N may be 1 or any other predetermined integer.

FIG. 1 shows an exemplary embodiment of a system of completing an Internet telephone call. In operation, audio signals are transmitted from telephone 101 through a portion of the telephone network 102 to a gateway 103 in accordance with a conventional circuit switched connection. The arriving audio signal at gateway 103 is then converted into packetized information, encoded in accordance with known techniques, and transmitted to gateway 105 using an Internet protocol. The call is then completed using a circuit switched connection between gateway 105 and telephone 107, as previously described.

Figure 2:
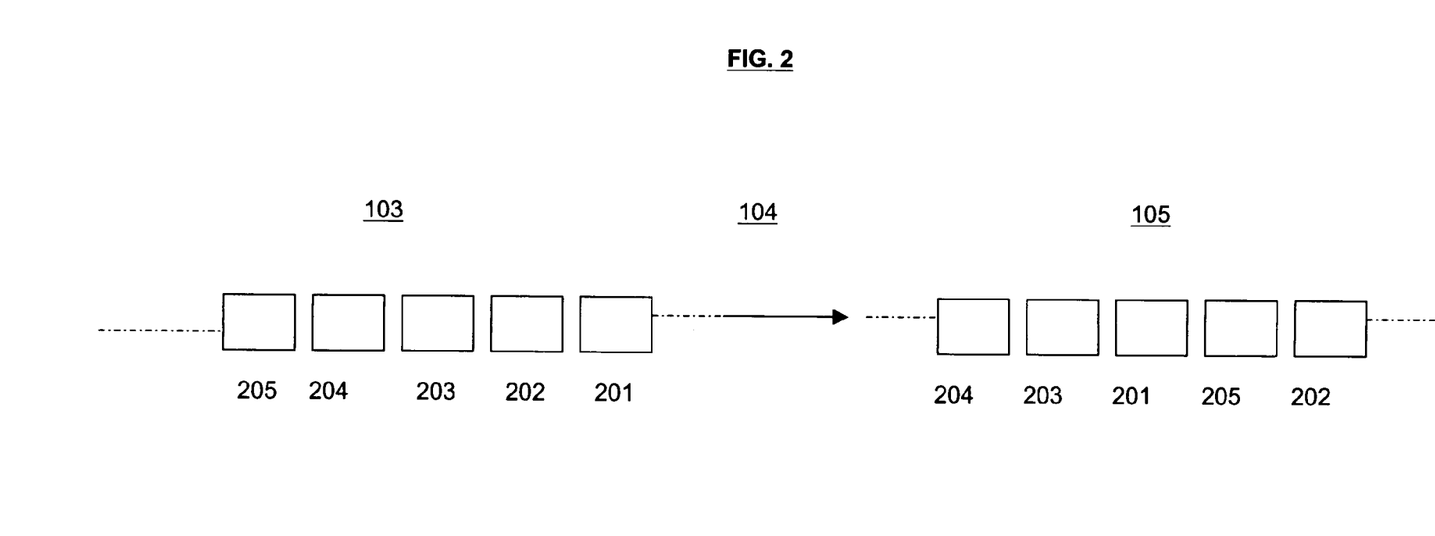
FIG. 2 represents delivery of a set of packets, showing that they are received in an order different from that being transmitted.

FIG. 2 represents a set of packets 201–205 at gateway 103 and the same set of packets at gateway 105. As indicated in FIG. 2, the packets are in a different order when they are received at the receiving gateway 105 from the order they leave from gateway 103. The packets arriving at gateway 105 could be in any order, including the correct order.

Figure 3:
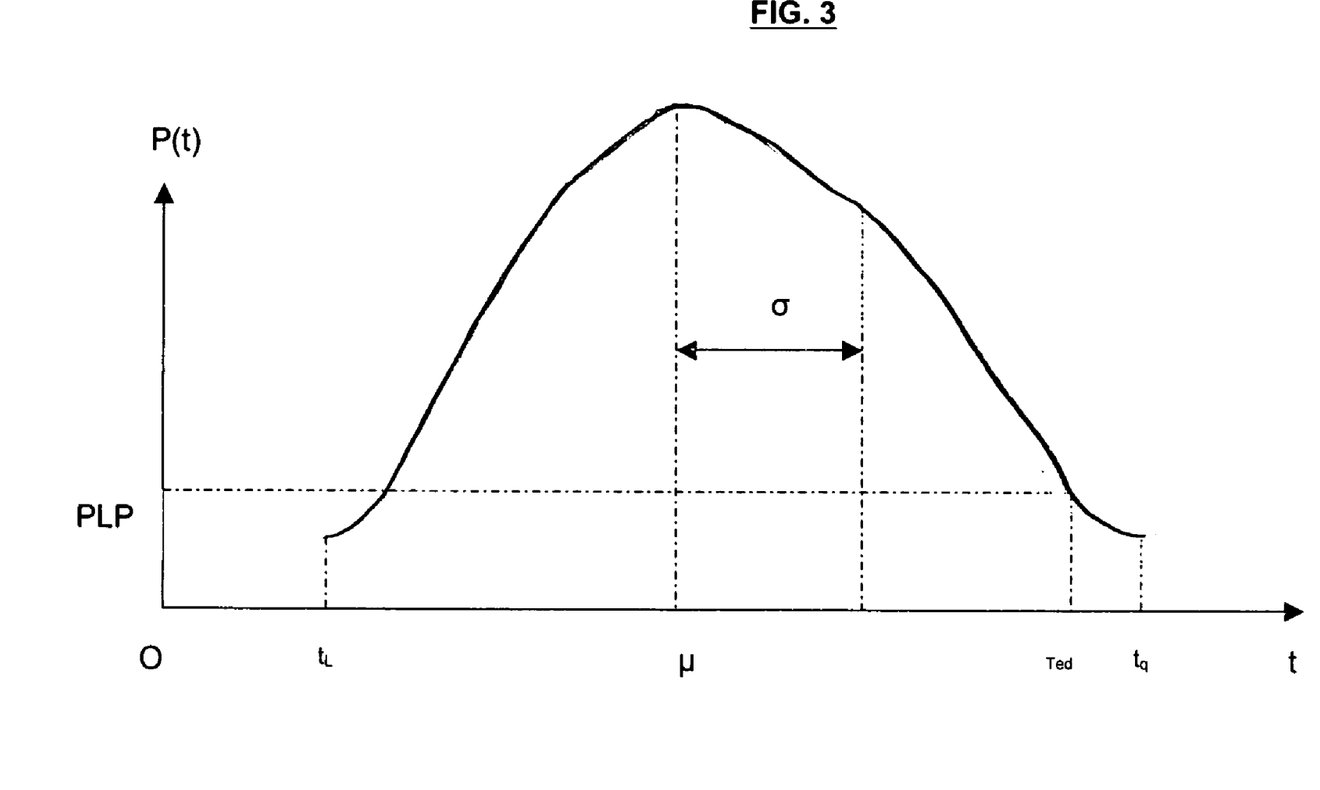
FIG. 3 is a diagram of Normal Distribution of delays.

It is commonly accepted that network delay follows either a Normal, Poisson or Lognormal probability distribution. For purpose of clearly describing the concepts of the present invention, we make the assumption that the network delay follows a Normal Distribution, which is shown in FIG. 3. Such a distribution is extremely common in packet networks.

The horizontal axis t represents the delay of a particular packet between a transmitting point and a receiving point, which has a distribution P(t) with a mean value $\mu$ and a standard deviation $\sigma$. In the figure, $\mu$ represents the average delay experienced by a packet when it travels from the transmitting point to the receiving point. If there were no delay variations (i.e., $\sigma=0$), the packets will be received at the receiving point in an order that is the same as the order in which packets leave the transmitting point. No buffering will then be needed in such a situation.

In FIG. 3, we note that there is an optimal delay $t_{ed}$ allowed by the application at the receiving party, above which the arriving packets are treated as late and so discarded. In practice, there is also a lower bound $t_L$ for network delays. $t_{ed}$ can be set in advance by the designer's choice of an acceptable probability of packet loss. For example, an acceptable packet loss probability of 2% would imply a specific $t_{ed}$. For a given distribution, 2% of the packets experience delays of longer than $t_{ed}$.

It can be seen that the greater is the delay variation, the greater is the value of $\sigma$, and thus the longer is the buffer size required in a receiver to insure a given packet loss probability. Pictorially, the wider the curve in FIG. 3, the longer the buffer at the receiver has to be to guarantee a specified packet loss probability. Conversely, with the same standard deviation, reducing the buffer size would cause increasing number of packets to become lost. Therefore, an intelligent decision has to be made concerning the choice of the buffer size and knowing the network delay distribution is a crucial step towards such a decision.

Figure 4:
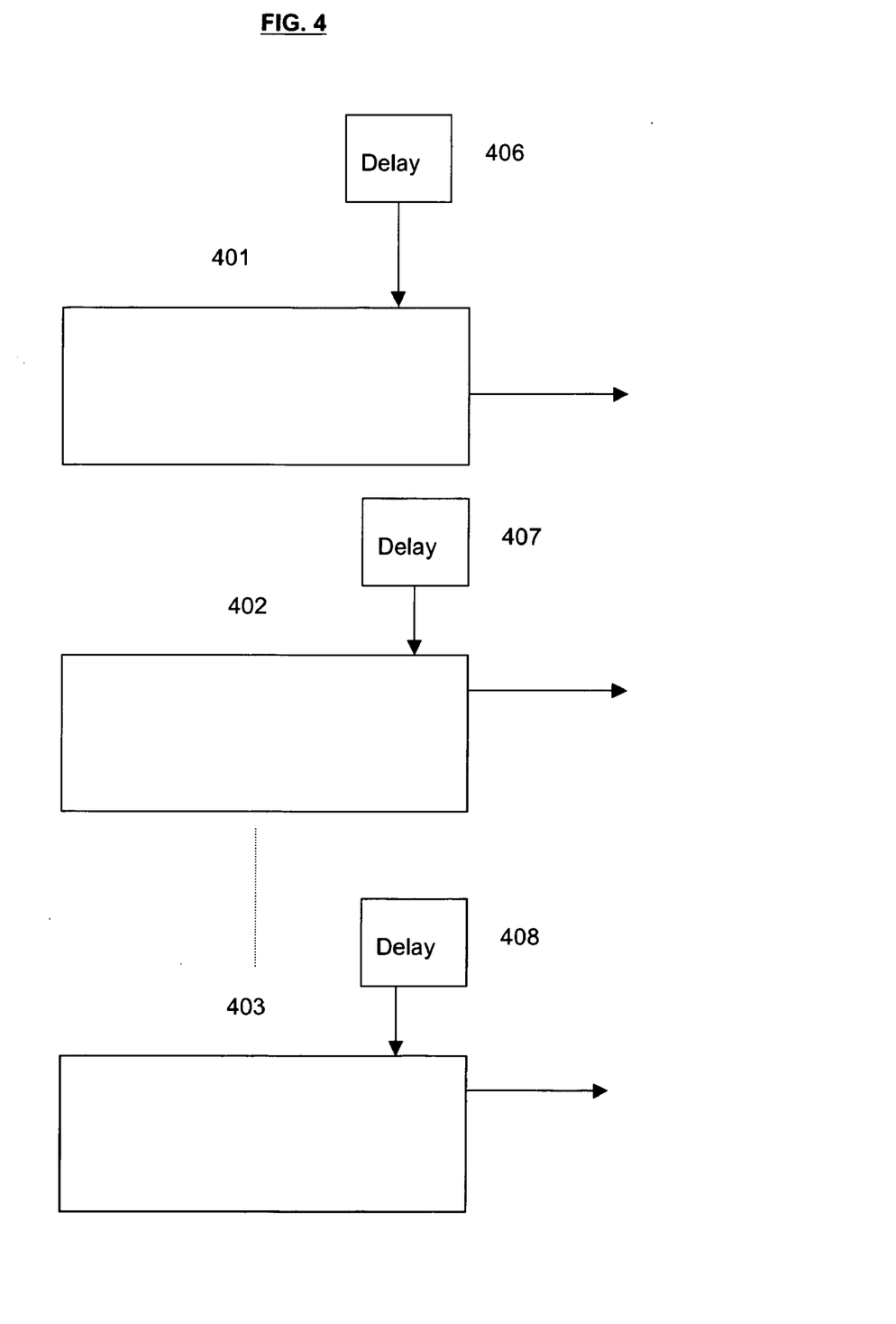
FIG. 4 shows a representation of a plurality of buffers in a gateway according to an exemplary embodiment.

FIG. 4 depicts a plurality of buffers 401–403, with an indication that other buffers are disposed between those shown. The buffers 401–403 represent storage buffers inside a receiving gateway such a gateway 105. Each buffer has an associated delay 406–408 representing the amount of time the data should be delayed prior to being read out of the buffer. The setting of the delays 406–408 is accomplished by loading a number that represents the amount of time the packet should be delayed in the delay timer 406, 407 or 408.

As packets arrive, they are placed into the next available buffer 401–403 and the delay is set. The delay associated with each packet is updated as explained hereafter, in order to cause each packet to be delayed by its actual delay plus an amount sufficient to cause the total delay to equal the optimal delay $t_{ed}$.

Thus, each arriving packet is processed in two ways. First, the packet is processed in order to ascertain its network delay and then update the probability distribution curve reflecting the probability distribution of packet delays through the network. A new optimal delay $t_{ed}$ is calculated based upon the new delay. Next, the packet is placed into a buffer and is delayed by an amount equal to the additional delay required so that the total packet delay from its transmission time is substantially equal to the optimal delay $t_{ed}$. This is further described later herein with reference to the flow chart of FIG. 5.

Figure 6:
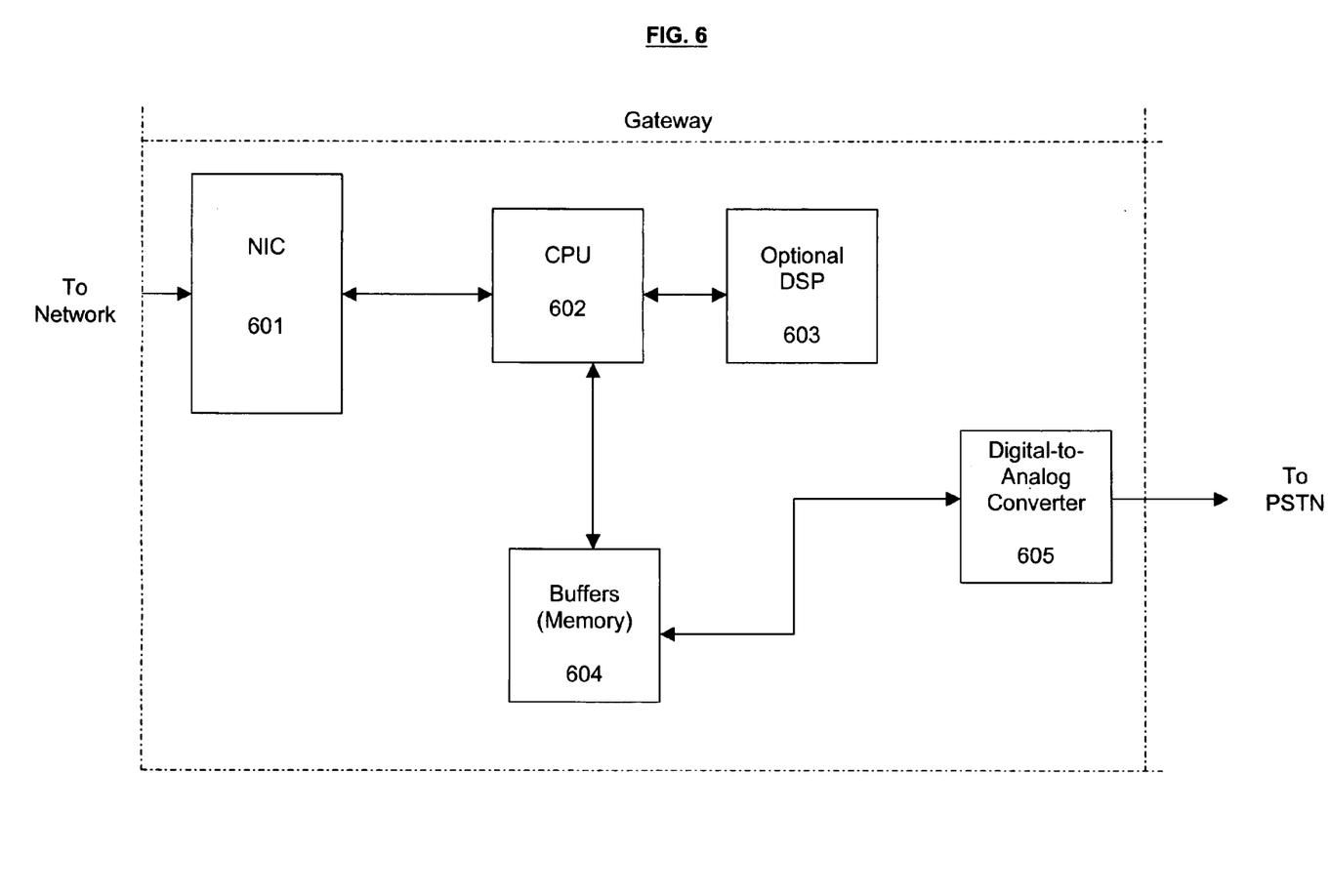
FIG. 6 is a function block diagram according to an example embodiment.

FIG. 6 shows a basic functional hardware block diagram of the components at the gateway 105 of the present invention. It is understood that these functional components may be implemented in hardware as shown or some or all of them may be implemented in software. Other configurations utilizing mixtures of hardware and software are contemplated as well as that shown.

In operation, network interface card (NIC) 601 receives information from the data network and decodes and/or demodulates such information. Depending upon the physical transmission technique utilized, NIC 601 may implement any one or more demodulation techniques known in the art such as phase shift keying (PSK), frequency shift keying (FSK), etc. Additionally, gateway 105 has compressing/ decompressing mechanism responsible for decoding any compression or other encoding mechanism utilized for transmission of the speech over the data network such as the Internet. For example, the well known G.723 or G.729 standards may be utilized. These algorithms compress speech for transmission over a data network. NIC 601 would be responsible for converting the compressed speech back to standard digital samples for processing by the remainder of the functional blocks shown in FIG. 6. Other decoding may be used as well.

Central processing unit (CPU) 602 reads the data in from NIC 601, and implements the two functions previously described. More specifically, the CPU 602 processes the data to update the probability distribution of the varying packet delays and therefore, obtain the new value of the optimal delay $t_{ed}$. Additionally, the packet is parsed to ascertain its specific delay through the network, $t_n$. The assigned delay, which equals the difference between an optimal delay $t_{ed}$ and the actual network delay $t_n$, is then matched with the particular packet and the packet is forwarded for storage to buffer 604. According to an example embodiment, once an acceptable probability of lost packets is established, it should remain fixed. What is updated periodically is the optimal delay $t_{ed}$, the delay beyond which the proper percentage of packets will be lost. That $t_{ed}$ is then utilized to normalize all packet delays to the same value.

Optionally, a digital signal processor (DSP) 603 may be employed to assist with the probability calculations and/or other functions. As still another option, a single DSP may be utilized which includes both the CPU control and input/output functions, as well as the DSP functionality. The particular hardware implementation of the control and signal processing functions is not critical to the present invention.

As the delays assigned to the various storage locations expire, an interrupt is generated to CPU 602. The interrupt causes the CPU to read a particular packet out of the buffer 604, and forward it to digital to analog converter 605 for transmission to the public switched telephone network (PSTN).

Figure 5:
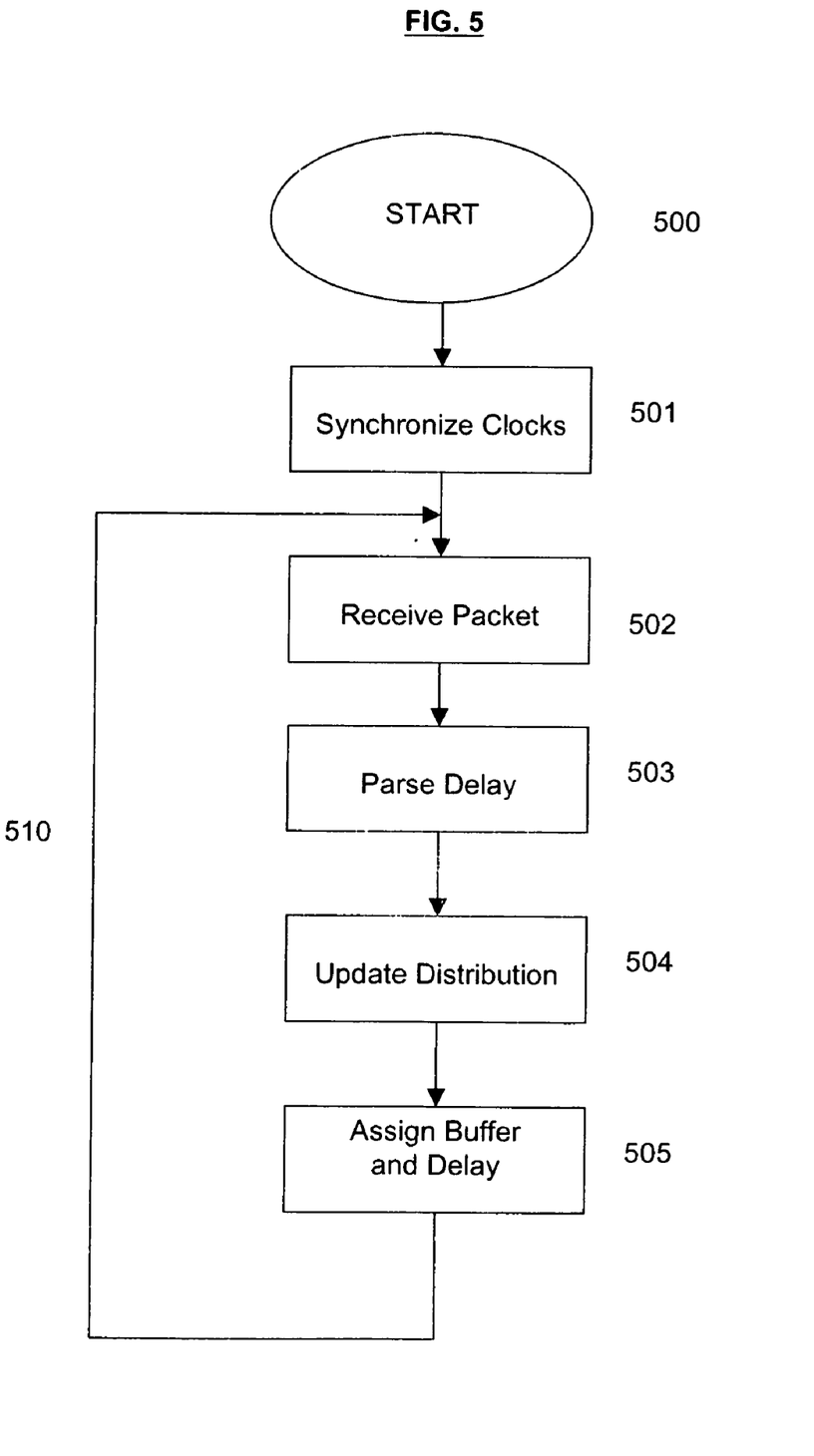
FIG. 5 is a flow chart of the functions implemented according to an example embodiment.

FIG. 5 is a flow chart describing functions that relate to the buffering and delay of packets being received in a receiving gateway according to an example embodiment. The flow chart is entered at block 500 and control is transferred to operational block 501. The functions of operational block 501 are to synchronize the clocks present at the transmitting gateway 103 and the receiving gateway 105 of FIG. 1, which are used to determine a transmitting time at gateway 103 and a receiving time at gateway 105 in the time field for each packet, respectively. More specifically, as previously noted, an important parameter in assigning the delays to be experienced by each packet at the receiving gateway is a varying transmission delay that such packet experienced in traversing the network. A standard technique is to read the time stamp applied by the transmitting gateway (i.e., 103), when the packet arrives at the receiving gateway. The difference between the arrival time and the time stamp in the packet can then be taken as the transmission delay or latency. The potential problem with such a system is that the clock at the receiving gateway 105 may not be synchronized with the clock at the transmitting gateway 103 that applies a time stamp. The functions of block 501 are to solve this problem.

Although there are a variety of techniques which may be used, one simple technique is to recognize that the clocks in fact do not need to be synchronized exactly. Rather, as can be appreciated from the prior discussion, the important fact is the varying delays among different packets, not the actual delay. Thus, one way to synchronize the clocks is for the receiving gateway to read the first arriving packet and assume a particular reasonable delay. For example, if the arriving packet is time stamped at 1:00 PM, the receiving gateway can assume initially that it took one minute to traverse the network and can set its clock to be 1:01 PM immediately upon receipt of the first packet. In this manner, any error between the transmitting and receiving gateways will be fixed for all of the subsequent packets, and thus, will not affect the shape of the probability distribution curve shown in FIG. 3. Other techniques may be used to synchronize the clocks, including even, in very sophisticated systems, receipt and processing of the atomic clock signal transmitted by the United States Government.

Once the clock is appropriately synchronized, block 502 receives the next incoming packet from data network 104 and processes the packet to parse the information in the header. More particularly, control is then transferred to block 503 where the time stamp is read from the packet and the network delay calculated. At block 504, the newly calculated network delay for the most recent packet is used to update the probability distribution shown in FIG. 3.

It is noted that in FIG. 5, the update distribution block 504 is shown as being executed each time through the main loop 510. Although this is possible, it may be unnecessary as the network delay usually does not vary so quickly that it requires updating with each received packet. Accordingly, the update distribution block 504 may be executed every Nth packet, where N may be a small number such as 5 or 10. By only executing the distribution update every Nth packet, processing resources are saved and very little is sacrificed due to the relatively slow nature of the varying network delays.

Once the new distribution is calculated and the new optimal delay $t_{ed}$ is arrived at, the last step of storing and assigning delay is executed by block 505. More specifically, the additional delay ta to be assigned to each packet is calculated as the difference between the optimal delay $t_{ed}$ and the actual network delay $t_n$ experienced by the packet.

Thus, the total delay experienced by each packet will be the network delay $t_n$ actually experienced plus the delay ta added to bring its total delay to the most recent value of $t_{ed}$.

Figure 5A:
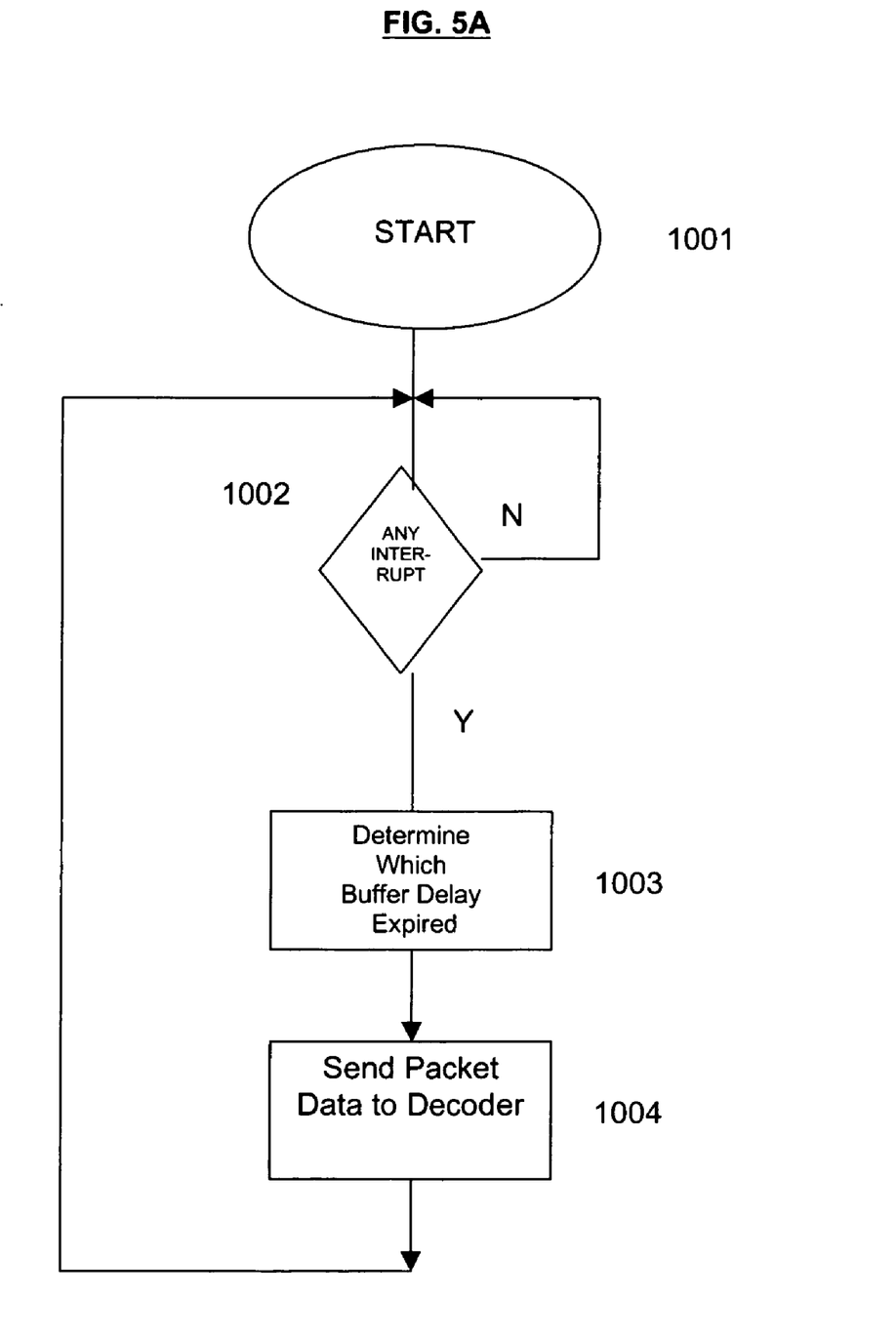
FIG. 5A is an addition flow chart related to transmission of packets according to an example embodiment.

FIG. 5A shows a flow chart of the software which may be utilized to convert the buffered received packets back into analog data for transmission over the network. FIG. 5A represents software that would typically run in a gateway such as that shown in FIG. 6. The flow chart is intended to be exemplary, and a variety of techniques for reading out the buffered packets may be utilized. As long as the buffers are read at a time when each of the respective delays expires, the packets will come out in the appropriate order.

At start 1001 of FIG. 5A, the system enters a loop 1002 which repeatedly checks as to whether or not any one of the timers which is assigned to a particular one of the buffers 401–403 has expired. If not, the system simply continues polling, but if so, an interrupt is generated which transfers control to block 1003. At block 1003, it is determined which of the buffers has had its timer expired and then block 1004 loads and transmits the data out of that buffer. It is notable that an interrupt driven system may be utilized or a synchronized system based on periodic polling may be used.

An additional option is to cap the value of the optimal delay $t_{ed}$ at a predetermined value in order to avoid the latency exceeding a predetermined maximum latency $t_q$. More specifically, in FIG. 3, the optimal delay $t_{ed}$ varies dynamically as a result of network delays. Intuitively, the optimal delay $t_{ed}$ can be thought of the total delay that should be experienced by each packet, including its network delay as well as the added delay from buffering, in order to insure a specified probability of packet loss. The maximum latency $t_q$ is meant to limit the optimal delay $t_{ed}$ from growing unbounded. Specifically, in extremely varying network delay conditions, it is possible that the recursive algorithm may determine a value of delay variance that is so large that the buffer required to insure the specified minimum delay is then beyond what is required to insure a maximum latency $t_q$. If the optimal delay $t_{ed}$ extends beyond $t_q$, the algorithm will cut off further expansion and not allow the buffer to be any longer. The maximum latency $t_q$ would be set in advance at, for example, two seconds.

In order to limit the buffer size through the use of $t_q$, an additional step would be added to block 505 of FIG. 5. More specifically, the software would compare the calculated delay against the maximum delay and if the former exceeded the latter, assign the latter amount to the buffer timer rather than the calculated amount. Put another way, the buffer latency will dynamically track whatever value is necessary to insure the specified minimum probability of packet loss, unless and until such buffer latency exceeds a predetermined maximum. Upon exceeding the maximum, the buffer latency will be capped, in order to avoid excessive latency.

Figure 7:
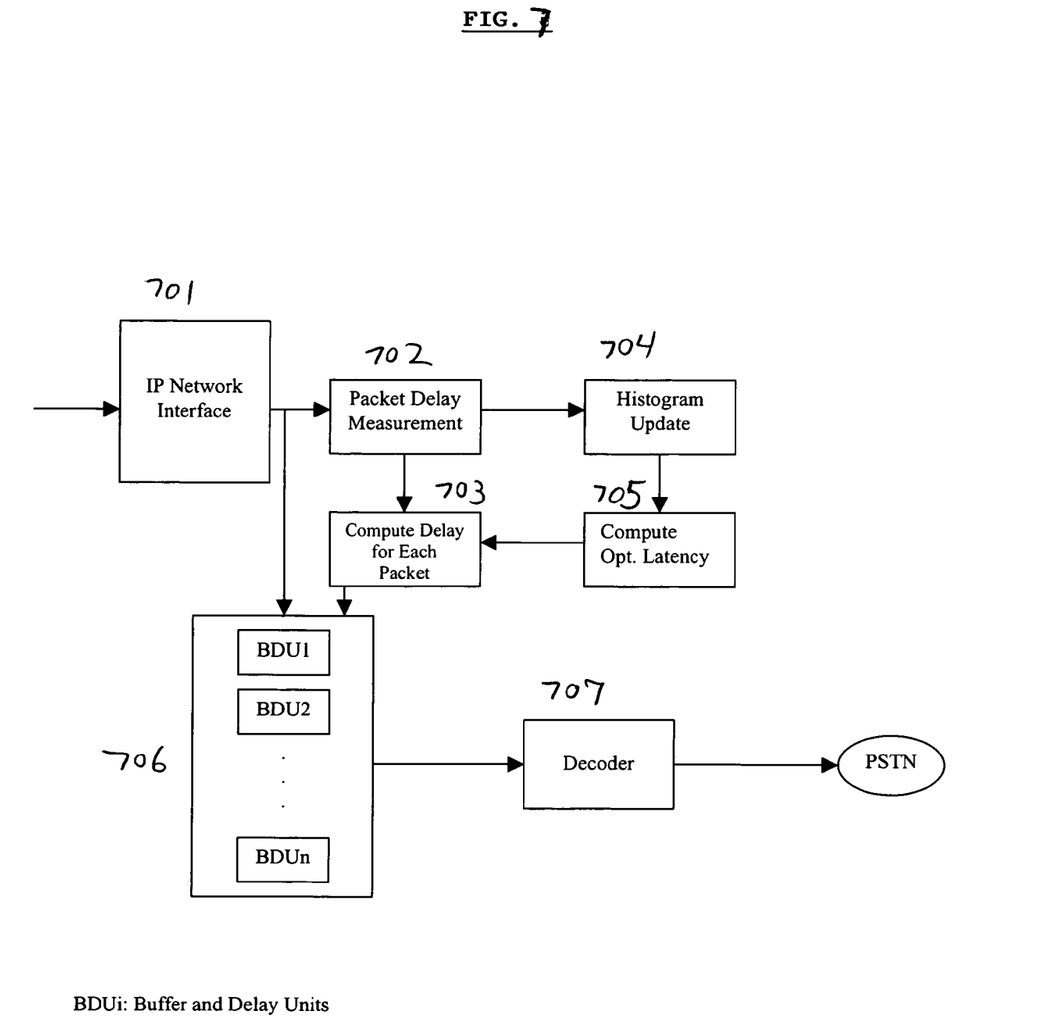
FIG. 7 is an alternative functional allocation diagram according to an example embodiment.

FIG. 7 shows a slightly different functional block diagram of how to implement an exemplary embodiment of the present invention at a receiving gateway. The IP network interface 701 reads packets of data from the Internet, and forwards those packets to the next available one of buffers 706. As indicated pictorially in the figure, the packet delay measurement blocks 702 simultaneously receives a copy of the received packet and measures the packet delay based upon the time stamp in the received packet and present time indicated on the clock in the receiving gateway. The calculated time is then sent to operational block 704 which updates the probability distribution curve (histogram) and based thereon, computes at block 705 the new optimal latency $t_{ed}$. The operational block 705 may or may not include a provision to cap the optimal latency as described with respect to $t_q$. The new optimal latency value $t_{ed}$ is matched with the actual packet delay by block 703, which computes the added delay necessary in order to cause the total packet delay to be equal to the optimal delay $t_{ed}$. That added delay is then sent to buffer 706 and associated with the particular storage location storing the subject packet issue.

The interaction between decoder 707 and buffer 706 may be accomplished in a variety of ways. In one form or another, decoder 707 must be signaled when the appropriate time for any of the stored packets has expired, and it should be read out.

While the above describes the preferred embodiment in the invention, various modifications or additions would be apparent to those of skill in the art. Such modifications are intended to be covered by the following claims.

What is claimed:

1. An apparatus comprising:
   plural buffers;
   a Central Processing Unit (CPU) for causing packets arriving from a network at said apparatus to each be stored in a separate one of the buffers, the CPU also being arranged to calculate, an optimal delay to guarantee a predetermined probability of packet loss and provide a minimum buffer latency beyond which a packet will be discarded, the optimal delay being calculated using based at least in part on a probability distribution that is updated upon the receipt of each packet; and
   a timer for causing each packet to incur an added delay of at least the difference between the optimal delay and an actual network delay experienced by said each packet.

2. The apparatus of claim 1 further comprising a network interface card coupled to the CPU for receiving signals from the data network.

3. The apparatus of claim 2 wherein said network interface card implements the G.723 or G.729 standard.

4. The apparatus of claim 1 wherein the CPU is a Digital Signal Processing (DSP) chip that performs DSP, CPU control and input/output functions.

5. A method of processing packets comprising:
   receiving packets from a network;
   ascertaining a network delay incurred by each packet in traversing the network;
   updating a probability distribution of packet delays through the network;
   adapting an optimal delay to guarantee a predetermined probability of packet loss and provide a minimum buffer latency for each packet, wherein the minimum buffer latency is based at least in part on the updated probability distribution;
   placing the packet into a buffer; and
   delaying use of the packet by an amount of time substantially equal to the optimal delay minus the network delay.

6. The method of claim 5 wherein the minimum buffer latency is recalculated every Nth packet.

7. The method of claim 6 further comprising comparing the minimum buffer latency to a predetermined value each time the minimum buffer latency is recalculated, and, if the recalculated minimum buffer latency exceeds said predetermined value, assigning the minimum buffer latency to be said predetermined value.

8. A gateway comprising:
   a buffer for storing received packets;
   a CPU for updating a probability distribution of packet delays through a network upon the receipt of each packet and for calculating a delay to which each of a plurality of received packets should be subjected before being read out of the buffer;
   a timer for subjecting each packet to the calculated delay which is equal to an optimal delay, the optimal delay being dynamically updated to guarantee a predetermined probability of packet loss and provide a minimum buffer latency based at least in part on the updated probability distribution, minus a network delay experienced by the packet, unless such calculated delay exceeds a predetermined maximum, in which case the predetermined maximum is utilized as the calculated delay.

9. A method of measuring varying delays among a plurality of packets, comprising:
   receiving a first packet at a receiving gateway;
   maintaining constant any synchronization error between a transmitting gateway and the receiving gateway by inserting a delay said packet is estimated to have experienced in traversing a network; and
   setting a clock at said receiving gateway to a value equal to a time stamp contained within said first packet plus said estimated delay.

10. The method of claim 9 further comprising receiving packets in addition to said first packet, reading a time stamp from each of said additional packets, calculating a network delay for each of said additional packets based upon said clock at said receiving gateway and said timestamp from each of said additional packets.

11. The method of claim 9 further comprising updating a probability distribution function indicative of network delays after receipt of every Nth packet.

12. The method of claim 11 wherein said updating further comprises recalculating a buffer latency.

13. The method of claim 12 wherein said buffer latency is assigned a value different from the recalculated buffer latency only if said recalculated buffer latency exceeds a predetermined value.

14. An apparatus comprising:
- a signal processor for calculating a delay experienced by each of a plurality of packets through a data network; and
- a buffer system for delaying further conveyance of each of said packets according to a minimum buffer latency which is time dependant on the calculated delay and an optimal delay, the optimal delay being adapted according to a probability distribution updated in response to receipt and processing of selected ones of each of said packets.

15. Apparatus of claim 14 wherein said buffer system is arranged to delay further conveyance by an amount also dependant upon a prestored maximum.

16. Apparatus of claim 15 further comprising an interrupt generator for generating an interrupt when said amount of time for said each packet expires.

17. Apparatus of claim 15 further comprising a poller for sequentially polling each of a plurality of storage locations within said buffer system to determine if a packet within said storage location is to be further conveyed.

* * * * *